March 7, 1967  H. R. GARRETT ETAL  3,307,325
CARTON FORMING AND FILLING MACHINE
Filed Oct. 21, 1964  6 Sheets-Sheet 1

INVENTORS
HOWARD R. GARRETT,
CLARENCE G. AUSTIN, JR.
BY Schroeder, Siegfried
& Ryan
ATTORNEYS

Fig 16a

United States Patent Office 3,307,325
Patented Mar. 7, 1967

3,307,325
CARTON FORMING AND FILLING MACHINE
Howard R. Garrett and Clarence G. Austin, Jr., Woodstock, Ill., assignors to The Pre-O-Form Corporation, Warsaw, Ind., a corporation of Indiana
Filed Oct. 21, 1964, Ser. No. 405,530
12 Claims. (Cl. 53—186)

The present invention is related to a carton forming and filling machine and more particularly to a machine of the type which erects flattened tubular blanks, fills and seals the same. This machine is particularly adaptable for use with cartons having thermo-plastic moisture proof coatings on the inner and outer surfaces thereof which coating serves as a heat and pressure sensitive adhesive in the forming and sealing of the cartons.

Carton forming and filling machines of this general type are known and in use. In general, these prior machines have been quite complex when combined in a single unit and where they have been used separately require special inter-connecting apparatus including conveying apparatus resulting in large space requirements. The present invention is directed to a combined carton forming and filling machine particularly adaptable for use in small dairies. In such applications, pre-formed cartons are not feasible for use because of space requirements and storage requirements. Thus, milk cartons of the type shown in the Egleston et al. Patent No. 3,120,335, dated Feb. 4, 1964 and entitled "Container With Infolded Bottom Closure" are available in flattened form and carton forming machinery is used to form the cartons from the flattened blanks. An example of such a machine is shown in the patent to Morris A. Terry, Patent 3,064,542, dated Nov. 20, 1962 and entitled "Carton Forming Machine." With such machinery, however, it is necessary to take a partially formed carton and provide additional forming before it can be utilized in a filling machine. This increases the number of machines and operators required to operate the apparatus and increases the complexity of the same.

The present invention is directed toward an improved machine which requires a minimum floor space and may be operated simply by a single operator. This meets the space and man power limitations present for small operations. The improved machine of the subject invention takes carton blanks and completes the forming of the carton in a continuous operation with a transfer of the completed carton in a condition where it may be readily utilized in a filling portion of the machine and sealed for distribution purposes. In particular the improved carton forming and filling machine of the present invention not only completes the forming of the bottom portion of the carton, but in addition pre-breaks or folds the upper inner triangular infold flaps of the gable top type carton so that the carton may be readily filled and sealed without further forming operation. A portion of this pre-break or folding of the gable top is done simply during the bottom forming operation leaving only a conventional fold and a simplified conveying apparatus after the carton has been inverted to an upright position following the carton forming operation. This simplifies the inter-connection of parts of the machinery mechanically and permits positive filling and sealing without further apparatus. In this sense, it eliminates complexity in the machine structure. Further carton damage as well as machine malfunction is eliminated by positively positioning the cartons and simplification in the handling of the same. This permits a combination of a filling and sealing apparatus with a minimum of space requirements and provides trouble free operation by a single operator.

It is therefore, an object of this invention to provide an improved carton forming and filling machine.

Another object of this invention is to provide a carton forming machine which performs the infold carton forming operation of the gable top of the carton simultaneously with the sealing or forming of the bottom of the carton.

A further object of this invention is to provide in a carton forming machine a simplified mandrel which permits both sealing and folding operations simultaneously.

A further object of this invention is to provide in a carton forming and filling machine, a simple conveying apparatus and an inter-connection between structures with a simplified synchronization system for insuring simultaneous and positive operation of the machine parts.

These and other objects of this invention will become apparent from a reading of the attached description together with the drawings wherein.

GENERAL DESCRIPTION

The improved carton forming and filling machine of the subject invention provides a simplified and compact arrangement of parts by means of which carton blanks in flattened form may be transformed into the completed carton, and the carton filled and sealed through synchronized operation which requires only a single operator and occupies a minimum amount of space. The carton forming portion of the overall apparatus is similar in certain detail to the carton forming machine shown in the patent to M. A. Terry, No. 3,064,542, dated Nov. 20, 1962, with modifications which will be described below. The modified carton forming machine facilitates combination with a carton sealing machine and an improved conveying apparatus interconnecting the two to simplify the arrangement of parts and provide for synchronized operation of the apparatus. The carton sealing portion of the overall machine is largely conventional and will be described only briefly except for the modifications which will be fully described hereinafter. Thus in the improved carton forming and filling machine, the carton forming portion utilizes a turntable type base with a plurality of mandrels symmetrically spaced thereon which mandrels move with operation of the base between predetermined stations or locations on the carton forming machine at which varied forming functions take place. Thus, the carton forming machine includes a station at which flattened carton blanks of the gable type are opened and positioned on a mandrel in an inverted position with the carton blank being bent along predetermined creases therein to facilitate folding and sealing of the bottom of the carton in the erection of the same. A second station in the carton forming machine heats the bent or creased portions of the bottom of the carton and folds the same into a bottom structure which is completed by a pressing operation. The cartons through their use of a plastic coating which is softened by a heating operation are provided with a sealed and rigid structure forming the base of the carton. In the improved version of the machine special mandrels which permit a folding or breaking operation of the top or gable portion of the carton simultaneously with the forming or sealing of the bottom of the carton is provided. The last station on the carton forming machine provides for the removal of the inverted carton from the turntable type base and mandrels thereon and inverting it into position on a conveyor. The conveying apparatus moves in a stepped function and at the first station in the conveying line, the top portion of the carton or the gable structure thereof is further creased to facilitate sealing after the carton has been filled. In the operation of the filling and sealing machine, cartons are moved along the conveying line in a stepped sequence in which the presence or absence of a carton is detected to control a filling apparatus and a defoaming apparatus associated therewith. Thereafter the carton tops are heated and folded with a final crip seal completing and sealing the carton at the terminal position of the machine.

In as much as a portion of this apparatus is for the most part conventional, there is shown herein in a diagrammatic form with mechanical details omitted for simplicity purposes. The portion of the carton forming conveying and sealing apparatus providing the improved combination of the machine parts will be described in detail and shown in the drawings.

SPECIFIC DESCRIPTION

Figure 1:
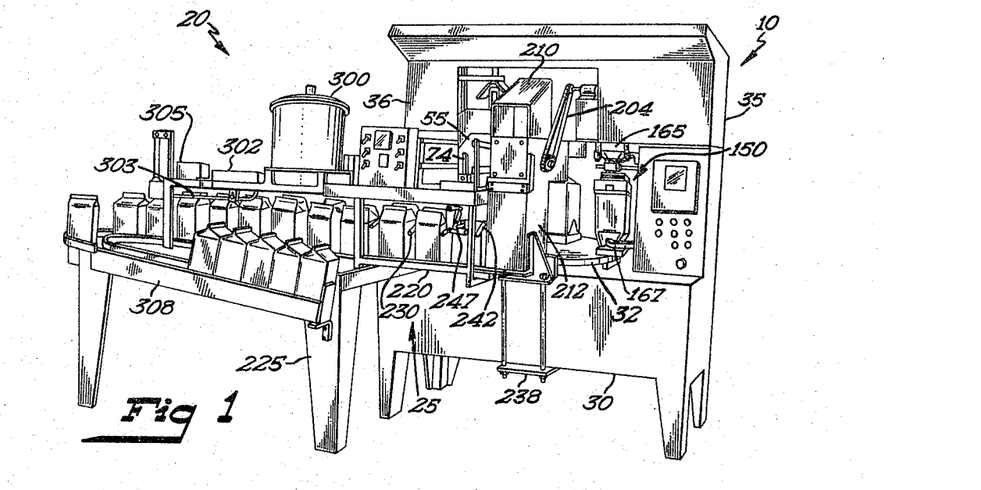
FIGURE 1 is a perspective view of the improved carton forming and filling machine.
Figure 2:
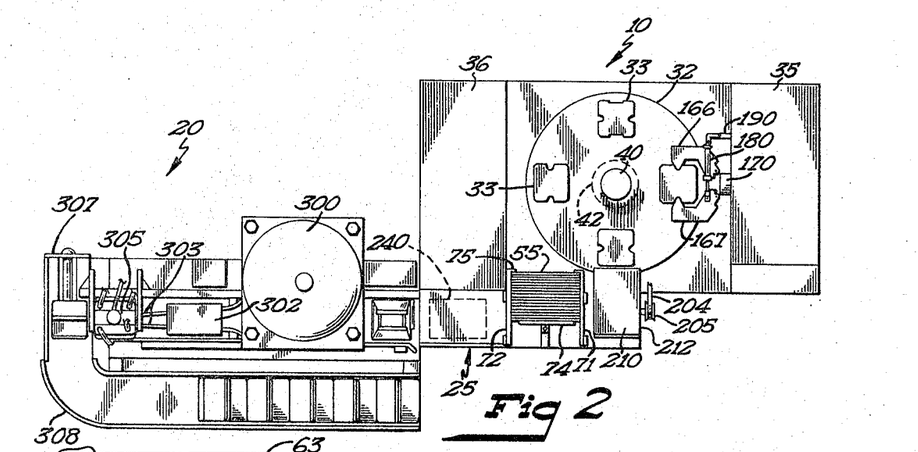
FIGURE 2 is a plan view of the improved carton forming and filling machine of FIGURE 1 with portions removed to show location of parts.

The improved carton forming and filling machine is shown in perspective in FIGURE 1 and in a plan view in FIGURE 2 with parts removed to provide an overall disclosure of the arrangement of parts thereof. The carton forming portion of this apparatus is indicated generally at 10 and the carton filling and sealing portion of the apparatus is indicated with the general designation 20. The carton forming portion 10 and filling and sealing portions 20 of the composite machine are connected by a conveying portion 25 which facilitates interconnection between the before mentioned portions of the machine and enables, as will be later noted, synchronization therebetween.

The carton forming portion 10 of the machine includes a base structure 30 having legs depending therefrom which mounts a turntable 32 having a plurality of mandrels 33 thereon. As will be seen in FIGURES 1 and 2, the turntable with the mandrels thereon is located centrally of the base structure and the base includes upstanding portions 35, 36 along the sides of the same to facilitate mounting of various work stations above the level of the mandrels. The turntable 32 is generally cylindrical in form and is mounted on a drive axis, indicated at 40, which is operatively connected to a motive means or stepping motor assembly 42 located below the turntable and within the confines of the base. The mandrels 33 stand upright on the turntable 32 and are positioned in the present disclosure in opposed relationship spaced 90 degrees from one another on the turntable such that they are moved in a circular path with rotation of the turntable on the axis of its drive shaft 40. In the operation of the motive means or stepping motor assembly, the turntable moves in 90 degree steps such that the mandrels start and come to rest at locations adjacent and in operative relationship with the various work stations to be hereinafter described.

Figure 4:
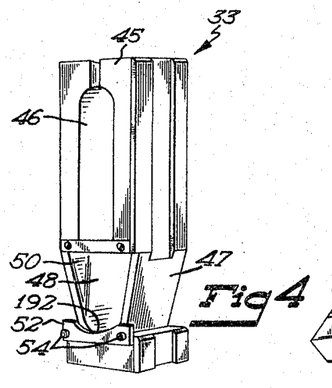
FIGURE 4 is a perspective view of a mandrel used in the improved carton forming and filling machine.
Figure 5:
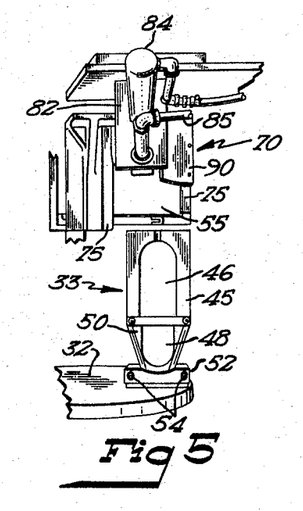
FIGURE 5 is a perspective view in part of the carton erecting station of the improved carton forming and filling machine.

The individual mandrels 33 are shown in detail in FIGURE 4 in perspective view. Each of the mandrels is generally rectangular in cross-section having relatively flat faces 45 thereon and an aperture through the center of the same, as indicated at 46, to reduce the mass of the same. The lower half of the mandrel includes two tapered or beveled faces 47 on two sides thereof with the opening 46 defining apertures 48 in the opposite faces of the lower portion of the mandrel. These faces or the edges of the apertures are tapered inwardly as at 50 for purposes to be later noted. Further the lower portion of the mandrel includes a supporting bracket 52 which is secured to the mandrel through bolt means 54 to limit the position of a carton blank thereon, as will be later noted. The bases of the mandrels include suitable means through which the mandrels may be secured to the turntable 32 in a conventional manner.

As the plurality of mandrels are rotated with the turntable on the base, they are positioned with respect to a plurality of work stations positioned on the upright sections 35, 36 of the base structure to perform various carton forming functions on carton blanks which are mounted on the mandrels. Thus as will be hereinafter seen, the mandrels are rotated relative to the base structure on the uprights 35, 36 thereon and with respect to the plurality of work stations which will be generally defined as a carton erection and bottom pre-break station, a carton flap heating station, a flap folding and carton sealing station, and a carton removal and turn over station. In the improved carton forming apparatus, the carton sealing and flap fold station also includes a pre-break function on the carton top to simplify the final carton forming and sealing operation.

Figure 3:
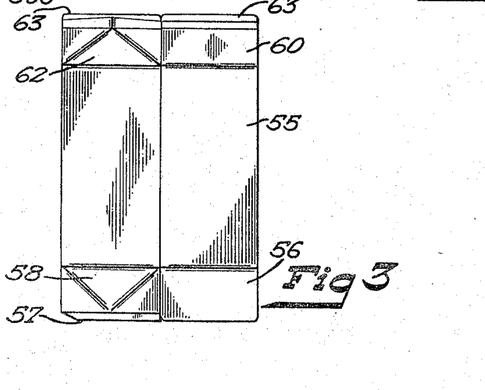
FIGURE 3 is a plan view of a flattened carton blank used in the improved carton forming and filling machine.

As will be seen in FIGURE 3, the carton filling and sealing apparatus utilizes carton blanks of the type having a thermo-plastic covering or surface. The improved carton form or blank is of the type shown in the patent to A. J. Seiple Patent No. 3,120,333, dated Feb. 4, 1964, and H. B. Egleston et al. Patent No. 3,120,335, dated Feb. 4, 1964. The carton blank is pre-creased and sealed along one side edge such that it is formed with one carton half folded onto the adjacent carton half. This particular structure provides an infold type flap for the bottom of the carton and a gable type top. In FIGURE 3, a carton blank, indicated generally at 55, is shown in a flattened form with bottom flaps 56, 57 and bottom infold flaps 58 which are bent at the crease lines by the carton forming machine, heated and folded to form a solid bottom for the carton. The top of the carton blank includes side flaps 60 of the gable top and infold flap sections 62 with the side flaps having lip portions 63 which are sealed together in the final sealing operation after filling. This carton blank is manufactured and supplied to dairies in a flattened form for erection and filling in the handling and distribution of milk products. The carton blanks are made in a plurality of sizes and the various carton forming and filling machines are generally adapted to accommodate various carton sizes. Such details are omitted herein for simplicity.

Figures 6, 10:
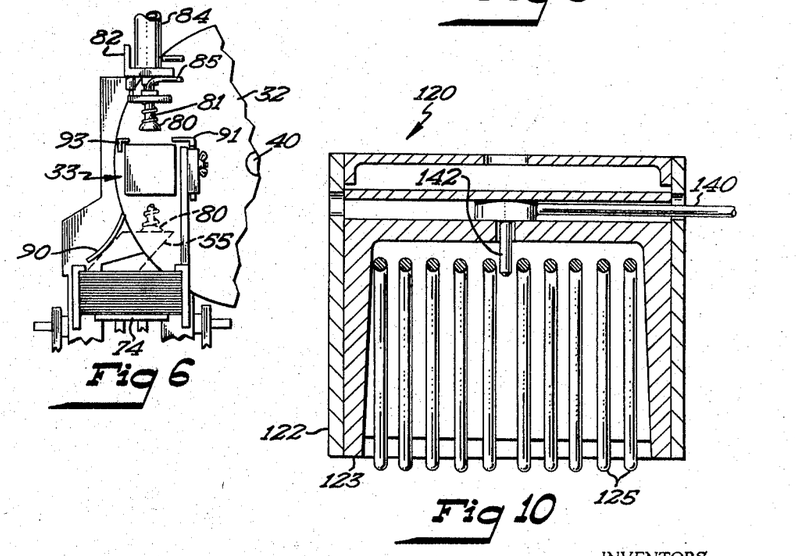
FIGURE 6 is a top view of the carton erecting station of FIGURE 5 with parts removed.
FIGURE 10 is a sectional view of the heater of the carton heating station of FIGURE 9.

The carton blanks 55 are loaded in a magazine or blank holder as will be best seen in FIGURES 1, 2 and 6. The blank holder, indicated generally at 70, includes a frame having side rails 71, 72 and a plate 74 which secures the carton blanks in an upright position between the guide rails and biases the same in a forward direction. Stops 75 included in the forward edge of the guide rails prevent movement of the carton blanks from the holder except through operation of the carton erection apparatus. The carton blank holder 70 is positioned adjacent and as part of the carton erection station extending slightly above the height of the mandrels on the turntable 32 such that carton blanks may be removed from the holder 70 and directed over the mandrels in an open position where a portion of the erection apparatus will move the blanks down onto the mandrels and pre-break the bottom flaps of the blanks in preparation of sealing the bottom of the carton.

The carton blanks are removed from the carton holder 70 by means of a pair of suction cups 80 which are mounted on a pair of shafts 81 slidably positioned in a bracket assembly 82 and move toward and away from the blank holder 70 through operation of a motive means 84. The cups have connected thereto a vacuum line 85 to provide for a gripping action on the carton blanks through suction as the suction cups 80 contact and grip the surface of the folded carton blanks. Both the application of the vacuum line and the operation of the motor or motive means 84 are controlled through a timing sequence to be later defined. The suction cups 86 are moved forward to engage the carton blanks in a sequence and as they contact and hold a surface of each carton blank, the carton blank is unfolded, as indicated in phantom in FIGURE 6. One edge of the carton blank engages a deflecting plate 90 to aid in the opening of the same and the suction cups which adhere to one surface only of the carton blank open the same to the rectangular configuration and moves it to a pair of stop structures 91, 93 which limit the travel of the carton blank into alignment with the edge of a mandrel positioned below the same. This portion of the apparatus is conventional with the prior carton forming machines and its specific details are omitted herein for simplicity.

Figure 7:
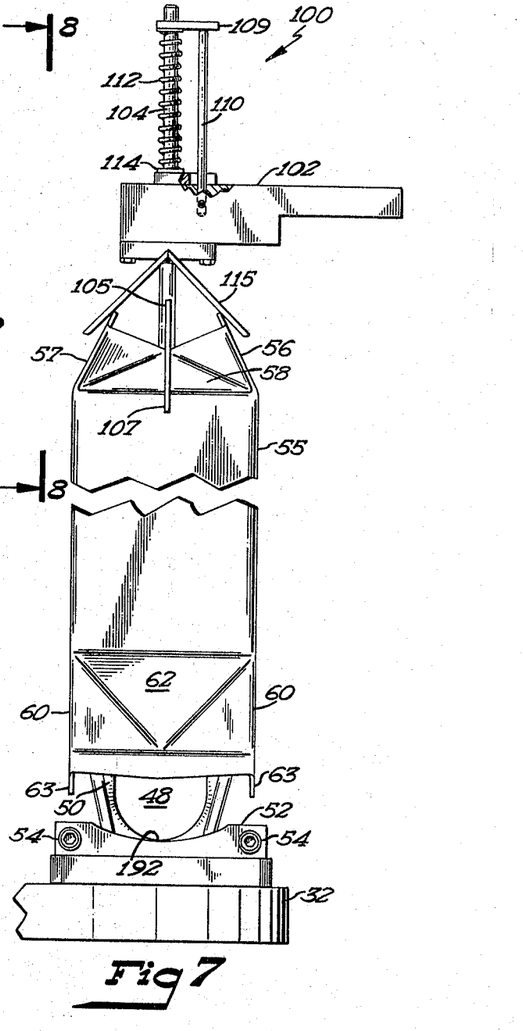
FIGURE 7 is a side elevation view of the carton pre-break apparatus included in the carton erecting station of the improved carton forming and filling machine.
Figure 8:
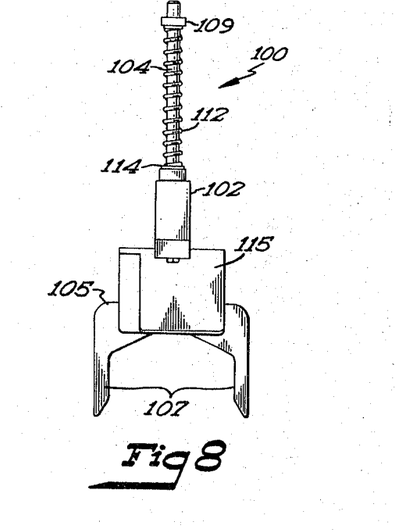
FIGURE 8 is a sectional view of the carton pre-break apparatus of FIGURE 7 taken along the lines 8—8 therein.

Positioned above the mandrel at this station is a pre-break mechanism, 100 such as is shown in FIGURE 7. The operation of this pre-break mechanism is co-ordinated with the operation of the carton erection apparatus such that the suction cups or the vacuum line therein is broken and the carton is free to move downward with operation of the pre-break mechanism. The pre-break mechanism is basically mounted on a flange type frame 102 normally connected to and movable with respect to the upstanding portion 36 of the base through a suitable motive means (not shown). The specific details of this structure are omitted for simplicity and, as will be later noted, this motive means is co-ordinated with the operation of the carton erection mechanism through the control circuit to be hereinafter defined. Frame 102 mounts a shaft 104 which is slidably mounted therein, the shaft carrying at one extremity a U shaped frame 105 having fingers 107 thereon. The shaft 104 extends through the frame 102 and is guided by a guide and spring retaining member 109 which is connected to the frame 102 and is positioned thereon by an upstanding support member 110. Encircling the shaft 104 is an over-travel spring 112 which is secured at one extremity to the shaft, as at 114, to bias the shaft and hence the U shaped bracket 105 with the fingers depending therefrom in a downward direction. Spring 112 encircling the shaft and connected thereto at one point permits over-travel or movement of the shaft upwardly within the frame and through the guide bracket 109 for purposes to be later noted. Also attached to the frame 102 is a pair of deflecting plates 115 which are mounted in a general V shaped form. As will be seen in FIGURE 7 the plates 115 are adapted to contact the side flaps of the carton to be bent or pre-broke at this station. The entire frame assembly 102 is moved vertically upward and downward with respect to the mandrel positioned below the same and on the downward stroke this assembly engages the carton blank and urges it down on the mandrel to a position where the lower edge of the carton blank engages the stop members 52 to position the carton blank on the mandrel in a predetermined position at the same height for all cartons. Continued downward movement will cause the U shaped bracket to engage the infold flaps of the carton, as shown in FIGURE 7, deflecting the infold flaps inwardly to cause bending or pre-bending at the creases in the same. After a predetermined amount of bending, the upward edge of the U shaped bracket is engaged as the shaft 104 moves upwardly. During this period of time the side deflecting flaps or plates 115 engage the side panel flaps of the carton causing the same to be bent inwardly and creased along their fold lines preparatory to folding the flaps into the solid bottom structure of the carton. The pre-break mechanism 100 in addition to positioning the carton on the mandrel, folds the carton along the creased lines of the carton blank or bends the same so that the flaps may be readily deformed after heating to be pressed into the solid bottom structure.

The sequence of operation of the carton erection and pre-break station is such that the carton blank is withdrawn from the holder, opened above the mandrel and positioned above the same where the carton blank is momentarily held in the open position as the pre-break structure is lowered to move the carton blank along the bottom fold lines for the formation of the bottom of the carton. The release of the carton from the suction cups of the carton erection mechanism is simultaneous with the downward movement of the pre-break mechanism. The movement of the carton blank down onto the mandrel is limited by the bottom stop bracket which, as will be readily recognized, may be changed for varying sized cartons and varying sized mandrels. The top portion of the mandrel which as will be noted in FIGURE 4, presents straight line surfaces against which the pre-break mechanism will work to positively define or break the carton flaps along the creased lines such that a fold will be made in the carton flaps in the same position at all times.

The erected carton blank on the mandrel which is pre-broke or folded to define the flaps is next moved with movement of the turntable to the flap heating station. This station is located intermediate the upstanding frame portion of the base and connected to one of the same where it overhangs the mandrel after the turntable has been rotated 90 degrees.

Figure 9:
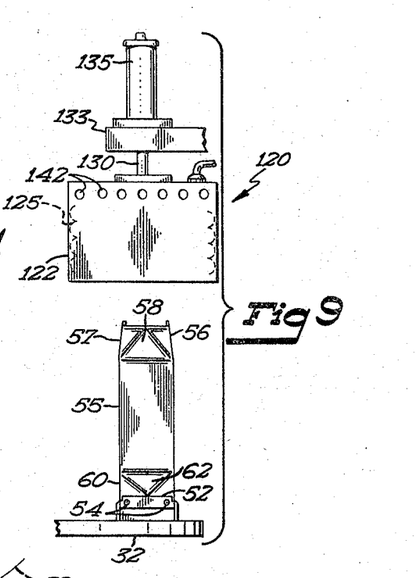
FIGURE 9 is a side elevation view of the carton heating station of the improved carton forming and filling machine.

The flap heater, as best seen in FIGURE 9, provides a hood structure 120 which is lowered down over the mandrel and the carton flaps thereon with the heat from the heating elements therein operating to soften the thermo-plastic covering on the carton blank for sealing purposes. The hood 120 at the heating station will best be seen in section in FIGURE 10 as comprising an outer shell 122 which is lined with a ceramic reflector material 123, the reflector material in turn mounting a coiled electrical heating element 125 which is adapted to be connected to a suitable electrical source. The outer shell or support structure 122 is connected to a shaft 130 mounted in a suitable supporting bracket 133 which is in turn attached to one of the upright sections of the base structure. Shaft 132 is connected to and positioned by a motor or motive means 135 which is mounted on supporting bracket or arm 133 for the purpose of moving the hood up and down vertically with respect to the mandrel positioned under the same such that the hood section encircles the flap portion of the erected carton on the mandrel for heating the same. The application of heat to the thermo-plastic covering of the carton softens the same such that the flap parts when folded together will adhere to one another to form a solid bottom structure for the carton. Also included in the hood structure is an air line 140 which is connected to a central air vent tap 142 for the purpose of circulating air and hence distributing uniformly the heat applied from the heating elements 125 to all surfaces of the carton flaps exposed thereto. In as much as only the upper portion of the carton or that defining the bottom flaps, as the carton is positioned inverted on the mandrel, will be exposed to the heat, only that portion will be effectively softened for sealing purposes. Hood 120 also includes a plurality of air passages 142 by means of which heat may be carried away from the hood to prevent over heating of the same. The actual motive mechanism for raising and lowering the hood is conventional and the control of the same is operated in sequence with the carton erecting and pre-break station such that the parts of the carton forming operation is carried on simultaneously at each of the work stations with respect to the cartons mounted on the mandrels positioned adjacent thereto.

Figure 11:
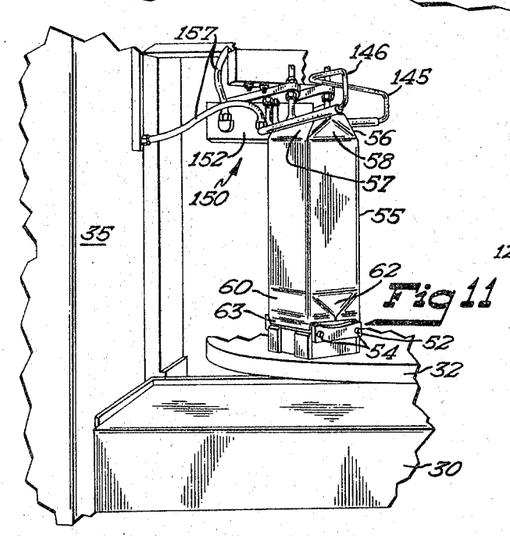
FIGURE 11 is a perspective view of the flap folding station of the improved carton forming and filling machine.

The erected carton with the flaps pre-broke and heated is rotated by rotation of the turntable 32 to the next succeeding work station. As will be seen in FIGURE 11, the carton as it approaches the work station moves through an arcuate path below a pair of guide and deflecting rails indicated generally at 145 and 146. This structure is connected to and supported by the frame structure or base and the rails engage the sides of the flaps opposite the infold flaps such that the side flaps are deflected downwardly toward one another in the forming of the bottom of the erected carton. The flap deflectors or guide rails 145 and 146 are so positioned relative to one another and to the arcuate path through which the mandrel travels that one of the side flaps is directed inwardly at a greater rate than the other so that the flaps will ultimately overlap and the infold flaps will be directed inwardly and underneath the side flaps. Further, the rails are tapered downward or vertically toward the mandrel so that the closing action of the flap takes place. As it reaches the third station or the seal station after the mandrel and carton have been rotated through approximately 90 degrees, the folded bottom flaps will be positioned underneath a press, indicated generally at 150. This press is mounted on a suitable supporting shaft and is movable vertically toward and away from the mandrel through the operation of a suitable motive means included on the upstanding support structure of the base member 30. The press anvil indicated at 152 includes an anvil plate 155 which directly contacts the base of the carton and presses the flaps against the top of the mandrel for sealing the heated and softened flaps to form the bottom of the carton. The softened thermo-plastic covering on the inside and outside of the carton when so pressed together form a solid bottom structure. Included in the press anvil 152, are suiting symbol cooling coils fed by pipes 157 leading to a source of cooling medium (not shown). The shaft 160 supporting the anvil is moved upwardly and downwardly through the motive means 165 in a conventional manner.

Figure 12:
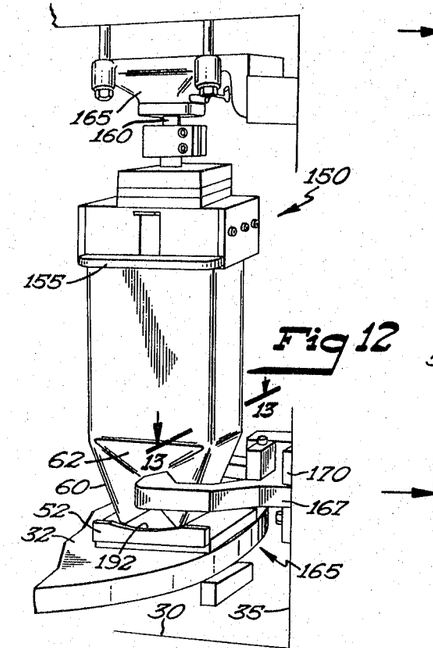
FIGURE 12 is a perspective view of the bottom sealing station of the improved carton forming and filling machine.
Figure 13:
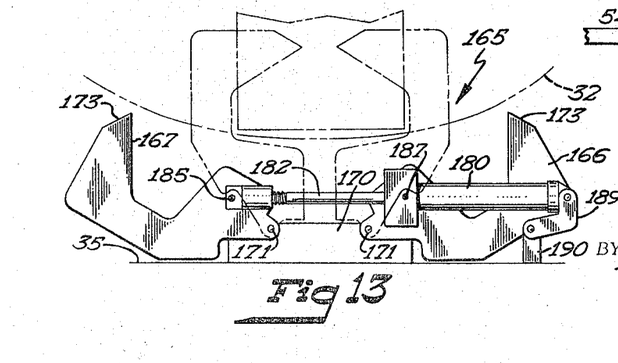
FIGURE 13 is a sectional view of the apparatus of FIGURE 12 taken along the lines 13—13 therein.

Simultaneously with the downward movement or press movement of the anvil 152, a second pre-break structure indicated at 165, operates to deflect the infold flaps of the top of the carton which are located at the bottom of the mandrels such as indicated at FIGURES 12 and 13. This pre-break mechanism 165, is comprised of a pair of jaws 166, 167 which are pivoted on a support 170 through suitable pivot means or pins 171. The jaws have tapered extremities 173 designed to engage the infold flaps of the gable top for the carton blank and pre-break the same. These jaws in their extended position, as indicated in phantom in FIGURE 13, align with the open recess 48 on the mandrel and the infold flaps 62 are deflected against the tapered surfaces 50 of the mandrel to crease the same along the lines such as are seen in FIGURE 3. The tapered sides 47 of the mandrel permit the side flaps 60 of the carton top to be moved inwardly as the carton top experiences the pre-break operation although this portion of the carton while deflected is not sufficiently creased to break the carton's sides of the top flaps for final sealing purposes. This function takes place at a later pre-break station. The jaws 166, 167 are connected together and operated by a suitable motive means indicated at 180 having a cylinder whose shaft 182 is connected to one of the jaws 167 through a pivot pin 185 while the cylinder portion of the motor 180 is connected to the opposite jaw 166, through a suitable pivot pin 187 and with the extremity of the cylinder being connected through a pivoted linkage 189 to a supporting shaft or bracket 190 connected to the side structure 35 of the base structure 30. By energization of the motive means or cylinder, which may be of the pneumatic or hydraulic type, the jaws are deflected from the rest position shown in solid in FIGURE 13 to the attracted position, shown in phantom in FIGURE 13 to cause the infold flaps to be deflected inwardly and creased along their lines preparatory toward the ultimate closure of the gable top after filling of the carton. The operation of the pre-break mechanism 165 takes place simultaneously with the sealing operation or the pressing of the anvil 155 on top of the mandrel to seal the bottom flaps of the carton in the formation of the erected carton. This sequence of operation is controlled through the control circuit to be hereinafter defined. It will be noted that the stop bracket 52 on the mandrel is tapered as at 192 to permit the side flaps to swing as the infold or pre-break operation takes place.

Figure 14:
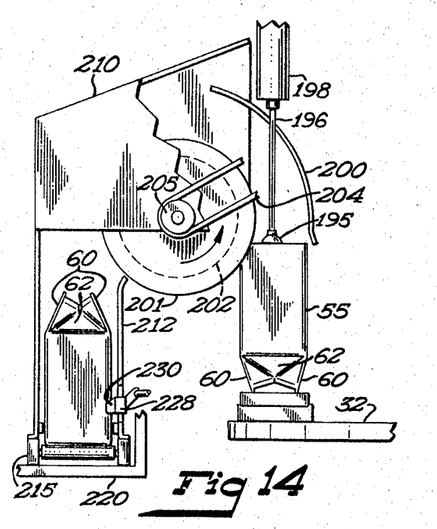
FIGURE 14 is a side elevation view in section of the carton unloading station of the improved carton forming and filling machine.

The final station on the carton forming portion of the apparatus is positioned 90 degrees displaced from the carton bottom sealing and pre-break function and generally diametrically opposite the flap heating portion of the structure. Thus as will be seen in FIGURE 14, the erected carton with the bottom sealed and the top flaps pre-broke are moved to the final station of carton turnover and removal from the mandrels. In this station, a suction cup 195 mounted on a shaft 196 and positioned by a motive 198 engages the sealed or pressed bottom of the carton to withdraw the same from the mandrel. This shaft is operated inwardly and outwardly from the confines of the motor in the manner of a conventional pneumatic actuator or hydraulic actuator with the shaft having a suitable suction line (not shown) connected thereto by means of which the carton may be picked up and moved upwardly off of the mandrel. A suitable deflecting plate 200 which is curved and a rotating drum 201 with flanges thereon 202 frictionally engage the carton after the vacuum line is cut off from the suction cup and the shaft drawn clear of the deflecting plate 200 to cause the carton to be directed in a circular path and inverted to an upright position, such as shown in FIGURE 14. The pick up drum 201 is driven through a suitable motive means connected thereto by a belt 204 and pulley 205 to provide continuous rotation of the pick up drum. The drum with the flanges 202 frictionally engage the sides of the carton as it is raised by the suction cup 195 such that the carton will follow around the curved arcuate path of plate 200 being gripped by the flanges 202 of the pick up drum 201 to position the same in the upright position on the carriage or conveying apparatus 25. A suitable covering structure 210 including side members 212 guide and position the erected carton and inverted carton on the conveying apparatus 25.

As will be seen in FIGURE 1, a conveying apparatus connects the carton forming portion of the overall machine and the sealing and filling portion of the overall machine. The conveying apparatus is comprised of a pair of side rails 215 and a base frame 220 which is suitably secured to the base 30 of the carton forming portion of the apparatus and the base 225 of the filling and sealing portion of the apparatus. Suitable connecting brackets such as is indicated at 238 aid in this connection.

The conveying apparatus 25 includes a conventional series of rollers on the base of the supporting frame to permit rolling motion of the carton thereon and thereby reduce frictional forces. Movement of the carton between the guide rails and along the conveying apparatus is provided by a longitudinal bar 228 shown in part in FIGURE 15. This bar is positioned adjacent the inner edge of the guide rail 215 adjacent the carton forming machine and includes a series of tabs or flanges 230 positioned along the extent of the same which tabs or flanges are adapted to engage the rear edge of the carton and move the carton in stepped sequences along the rollers toward the sealing and filling machine. Bar 228 is adapted to move longitudinally through a pair of guides (not shown) parallel to the guide rails 215 and slightly above the same such that the tabs thereon engage the lower section of the carton. The operating bar 228 in addition to moving longitudinally along the extent of the conveyer rocks toward and away from the side rails 25 such that the tabs 230 thereon will be moved out of contact with the cartons as the bar is returned to a start position. Thus in the operation of the conveying apparatus, the bar 228 with the flanges 230 thereon is moved to a start position and rocked toward the conveyer line or apparatus such that the tabs or flanges 230 are positioned behind the erected cartons to engage the back side of the same with respect to the direction of motion of the cartons. The bar 228 is then moved longitudinally a given distance advancing the cartons by virtue of the engagement of the tabs 230 a predetermined distance. At the end of this movement or travel of the cartons, the bar 228 is rocked backwardly such that the tabs 230 thereon move out of contact with the cartons. The bar then returns longitudinally in the position away from contact with cartons back to the start position. At this point the tabs 230 on the bar are positioned behind the cartons on the conveying line. Thus the cartons on the conveying line are moved in a series of stepped movements a given distance along the conveying apparatus. In the first station beyond the carton unloader, the carton is positioned beneath a top pre-break mechanism, indicated generally at 240. This structure is mounted on the conveyer or the frame 220 thereof and includes a pair of hinged plates 242 which are mounted on downwardly extending side plates 245 and pivoted thereon. The tie linkage 246 connected through a bell crank type connection 247 insures that both plates move simultaneously toward and away from one another. A suitable connecting link 250 leads to an actuator which is controlled in a predetermined sequence whenever a carton is at rest in the position under the pre-break station. This pre-break structure 240 receives an erected and upstanding carton with the infold flaps of the gable top already pre-broke or creased. The hinged plates 242 engage and bend or crease the side flaps and the lip portions 63 of the carton to facilitate ultimate sealing of the same. The plates 242 are rotated from the position shown in FIGURE 15 where they engage and meet the side flaps of the carton and bend the same to an upright or inoperative position where they are raised to a vertical and substantially parallel position with the mounting side plates 245. Thus the first station beyond the carton unloader is the top pre-break structure and each carton received on the conveying line is so processed to facilitate filling and sealing of the same.

The conveying apparatus in moving the empty cartons in the erected and creased form advances them toward the filling and sealing machine 20. The details of this apparatus are for the most part omitted and may take varying forms with the scope of the present invention. As an example of apparatus of this type, reference is made to the patent C. Z. Monroe et al., Patent 2,957,289, dated Oct. 25, 1960 and Patent 3,120,089, dated Feb. 4, 1964. The details of the filling and defoaming portion of the apparatus as it is connected to the reservoir 300 and controlled through suitable control means are not significant except as to the sequence of operation of the same with the remaining portion of the apparatus. Thus the control elements for such a structure are shown and described in connection with the circuit diagram. Associated with the filling and defoaming apparatus is a limit control responsive to the presence of a carton and identified as a no carton no fill control. The heating element for the top flaps are shown schematically in 302 as are the fold guides 303 and the top seal clamps or press 305. Each of these components may take varying forms and only their inter-relationship with respect to the remaining portion of the apparatus and the timing of operation of the same is significant herein. The sealing portion of the apparatus as shown in FIGURE 2 includes a discharge mechanism 307 (see FIGURE 2), and a discharge ramp 308 where the filled and sealed cartons are positioned. Thus, the filling and sealing portion of the apparatus, regardless of its specific form, will receive cartons from the top pre-break structure 240 which are moved along a conveying line in a stepped sequence through a top spreader such that the filling tube may be inserted therein, to the actual filling and defoaming portion of the apparatus, and thereafter the filled cartons are to be directed through a channel or structure which heats the exposed side panels of the gable top of the carton to melt or soften the thermo-plastic coating thereon. The heated side flaps of the gable top of the carton will then be deflected inwardly toward one another through a suitable flap folding mechanism, similar to that shown at 150 in the carton forming apparatus, and thereafter a pair of clamping jaws or press jaws will engage the upper lips 62 of the gable top of the carton and press the side flaps and the lips together to seal the gable top of the carton. These various steps take place in the stepped sequence as the conveying apparatus moves the cartons from one station to another in the same sequence as the cartons are moved along the conveying line and the turntable is moved on the carton forming apparatus. The filled and sealed cartons are then moved off of the filling and sealing portion of the apparatus to a discharge chute 308 which has a slight slope and a roller bottom (not shown) so that the filled and sealed cartons may move under the influence of gravity down through a carton take-off chute.

The control circuit for the improved carton forming and filling machine is shown schematically in FIGURES 16a and 16b which figures inter-connect in a manner to be hereinafter defined. The carton forming portion of the apparatus includes a main power circuit energized from a single phase alternating current source indicated by the conductors 310 which is controlled by an off disconnect switch 311 and supplies the power for a vacuum motor 315 and an index drive motor 320 of the index assembly 42 to the turntable 32 on the base 30. Also energized from the main power conductors is a voltage step-down transformer 312 whose primary winding 313 is connected across the supply conductors 310 and behind switch 311 with the secondary winding 314 being connected to the main control circuit evidenced by conductors 321 and 322. Also included in the main power circuit is a heater element 325 connected across the supply conductors and controlled by a contact 350a of a control relay 350 in the control circuit. The vacuum motor 315 is connected to the supply conductors behind the control switch 311 through control contacts 333a of a relay 333 controlling the energization of the same. Similarly, index motor 320 is controlled through the operation of the relay contact 333a of a control relay 330 included in the control circuit.

Figure 16A:
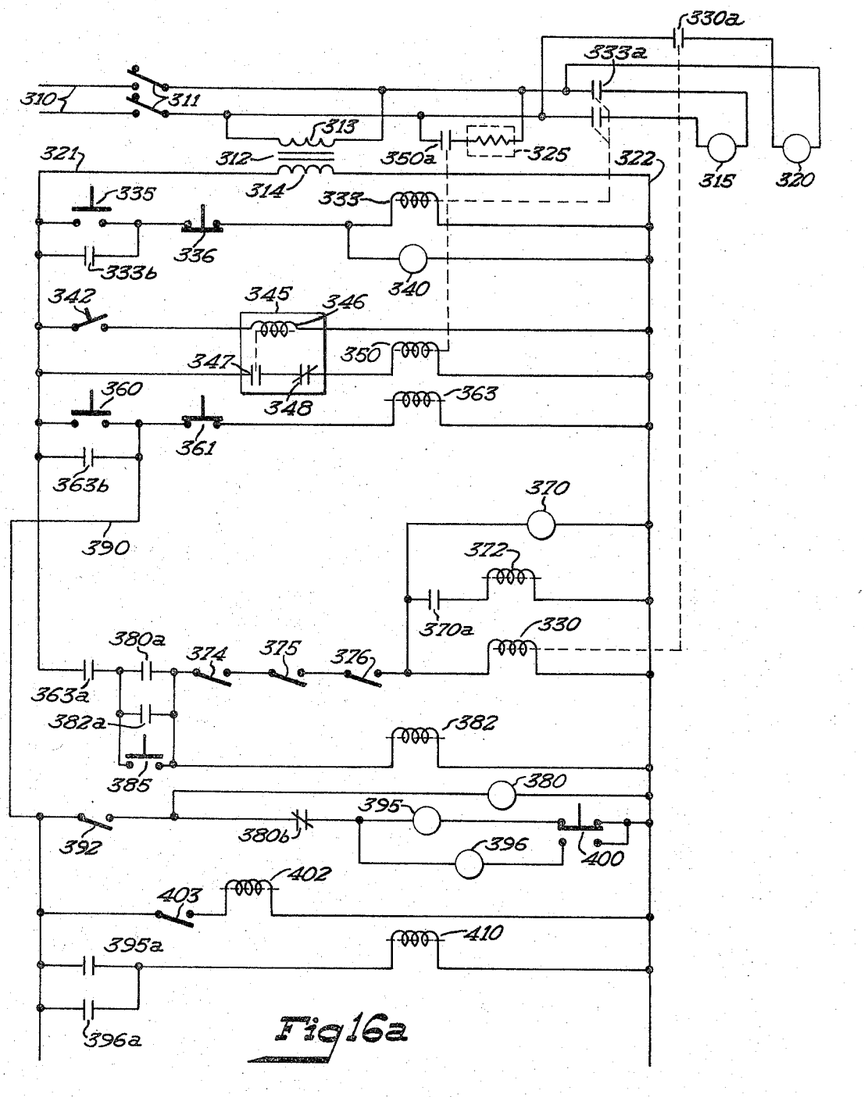
FIGURES 16a and 16b are the schematic circuit diagram for the improved carton forming and filling machine.
Figure 16B:
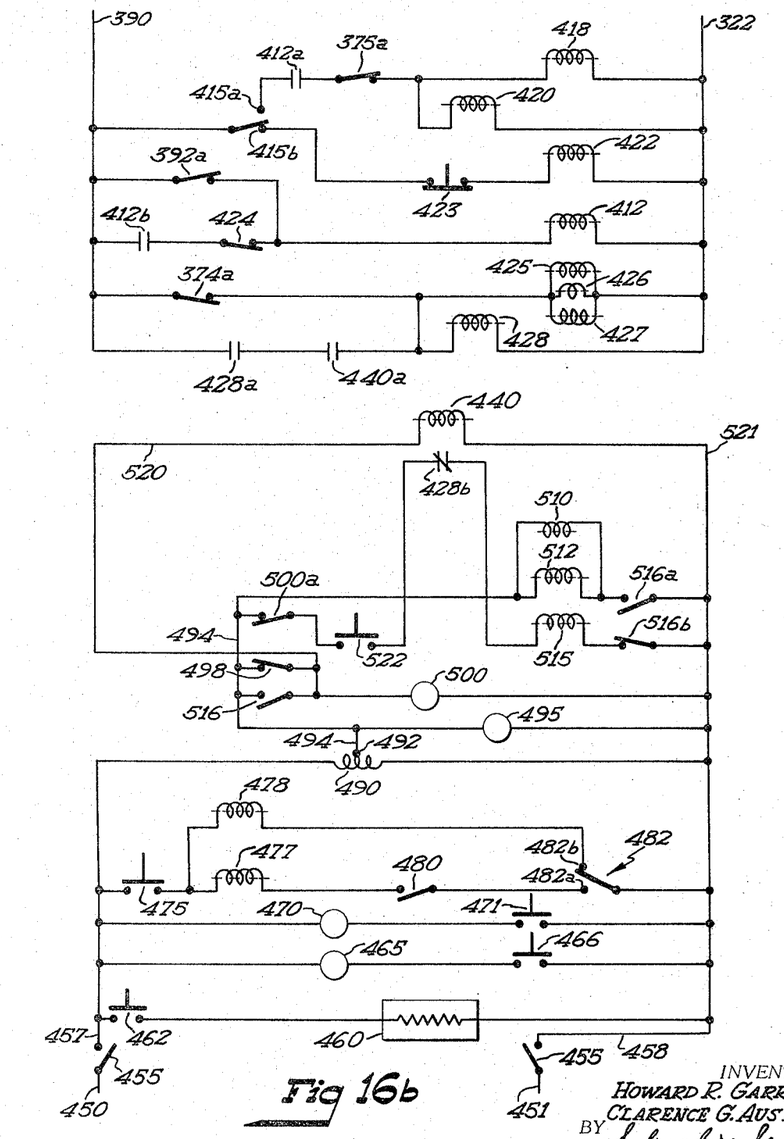

As will be seen in FIGURE 16a, the control circuit between conductors 321 and 322 includes a first start push-button type switch 335 having in series therewith a similar stop switch 336 and the control winding 333 of the relay controlling the energization of the vacuum motor 315. In parallel with the control relay 333 and energized from the start push-button 335 is the unloader motor 340 which drives the pulley 205 and drum 201 of the unloader station. As previously indicated, this motor is continuously running. Start switch 335 has a holding contact 333b in parallel therewith. Heater 325 is controlled through the operation of the control relay 350 which in turn is controlled through the operation of a suitable temperature controller, shown in block at 345, and including a control relay 346 with its control contact 347 and a temperature responsive contact means or thermostat 348 in series with contact relay 350. The operation of relay 346 of the temperature controller 345 is controlled by an on-off manual switch 342 and the control relay 346 through its contact 347 sets up the energization circuit for the control relay 350 with a temperature control 348 acting as an override to prevent over heating. A second start contact or push-button 360 and stop contact or push button 361 connected in series therewith across the conductors 321, 322 controls the energization of a control relay 363 whose contact 363a, as will be later defined, controls the timing circuits for the operation of the index motor 320. Control relay 363 includes a holding contact 363b connected in parallel around the start push-button 360 in a manner similar to the holding contact 333b around the start push-button 335 controlling the energization of the control relay 333 for the vacuum motor 315. Control relay 363 through its contact 363a sets up the energization circuit for the control relay 330 operating the index motor 320. This circuit includes a normally open contact 380a of a timing relay 380 and limit switches 374, 375, 376 in series circuit which limit switches are located respectively and operated by the heater motor for heating the bottom flaps of the carton former, the press for sealing the bottom flaps of the carton, and the carton blank loader which solenoid operates the pre-break mechanism for the bottom flaps as shown in FIGURE 7. These contacts are connected in a series circuit from conductor 321 and set up the energization circuit for the relay coil 330 which is completed through conductor 322. In parallel with the relay coil 330 is a timing relay 370 having time delay on dropout and whose control contact 370a is included in a circuit parallel with the relay coil 330 and timing relay 370 and in series circuit with the pickup solenoid 372 which operates the vacuum cups associated with the hydraulic motor 84 for opening the carton blanks. A holding circuit is provided around the timing relay contact 380a through an additional control relay 382 whose contact 382a is in parallel with the relay contact 380a. Also included in parallel with this circuit is a reset push-button 385 which is normally used for test purposes. Thus the holding circuit, as will be seen in FIGURE 16a, is energized through the contact 363a from the conductor 321 and initiated by operation of the contact 380a or the push-button 385 to set up the operation of the holding circuit through closure of the contact 382a. The various limit switches 374, 375, 376 insure that the index motor control relay 330 will not be energized to operate the index control motor unless all of the work stations are in the raised or cleared position.

Start push-button 360 and its holding contact 363b of control relay 363 sets up a further energization circuit through conductor 390 to additional timing relays and the various solenoids together with the operation of the valves in the vacuum line. Thus the conductor 390 supplies a first timing control circuit through a table limit switch 392 which is closed only when the turntable 32 is in a rest position and the mandrels thereon are aligned with the work stations. A first timing relay 380 is connected in series with this limit switch and across the supply conductors 390 and 322 for energization. In parallel with this circuit are a pair of timing relays or cycling relays 395 and 396 which are connected in parallel and in series with the normally closed contact 380b of the timing relay 380 with the timing relays 395 and 396 being selectively connected into the control circuit through the operation of a double pole, double throw cycling selector switch 400. This parallel circuit is completed to control supply conductor 322. Also connected across the supply conductors 390, 322 is the conveying solenoid 402 which controls the stepped operation of the controller and has in series therewith limit switch 403 which de-energizes the motor operating the bar 228 when it reaches a rest position. Timing relays 395 and 396 are of the time delay on closing type and have different timing cycles for varying the cycle of operation of the carton forming machine. These timing relays have, respectively, contacts 395a and 396a which are connected in parallel and in series with a solenoid 410 controlling the application of heat to the carton flaps through the operation of the motor which raises and lowers the hood 120. In this manner, the hood through adjustment of the speed at which it is raised or lowered will control the operation of its limit switch which in turn controls the operation of the indexing motor 320 and hence the speed of operation of the carton forming portion of the apparatus.

Also included in the control circuit or controller by the start push-button 360 through the conductor 390 are energization circuits for the loader solenoid 418 and the unloader solenoid 420 which are connected in parallel with one another and in series with a second limit switch contact 375a of the press limit switch on the carton forming machine, a contact 412a of a control relay 412 and a selective limit switch 415 which in the "a" position represents movement of the pick up suction cups away from the retracted position. The circuit is completed from the conductor 390 to conductor 322. In the retarded or back position 415b of this limit switch, a second circuit is provided through a selectively operated push-button 424, which is included for test purposes, to a solenoid 427 which solenoid operates the vacuum pick up lines for both the loader and unloader mechanism at these two stations. The control relay 412 is also energized across the conductors 390, 322 through a circuit which includes a second contact for the table limit switch 392a, this switch indicating the position of the turntable at a rest or work position. In parallel with the contact or limit switch 392a, is a holding contact 421b of the control relay and a second limit switch 424 indicating that the carton loader or the pre-break mechanism shown in FIGURE 7 is at a bottom position when the switch is normally closed.

The final portion of the control circuitry for the carton forming portion of the apparatus includes an energization circuit for solenoids 425, 426, 427 operating the press or valve or controlling motion of the press in the bottom sealing portion of the carton forming apparatus, the motion means for the bottom pre-break mechanism at the carton loader station, and the motion means for operating the fold plates at the final pre-break station 240. This circuit is controlled through a second limit switch 374a of the heater limit switch which corresponds to the down position of the hood 120 to energize the solenoids 425, 426, 427 operating the same simultaneously. In parallel with this press solenoid is a control relay 428 which, as will be later noted, provides for the inter-connection and control between the carton forming portion of the machine and the filling and sealing portion of the machine for synchronization purposes. An alternate energization circuit for the control relay 428 and the solenoids 425, 426, 427 is provided through a holding contact 428a of relay 428 and a contact 440a of a control relay in the fill and seal portion of the apparatus.

The fill and seal portion of the improved machine as previously indicated is largely conventional and its structural details are basically eliminated for simplicity. In its control circuit, as seen in FIGURE 16b, an alternating current evidenced by conductors 450, 451 is connected through disconnect switches 455 to control the application of power to the main control of the filling portion of the apparatus at its conductors 457 and 458. In this control circuit, the main heater element 460 is controlled basically through the energization of an on-off type push-button switch 462 connected directly across the source of power. For simplicity, fusing and other protective circuitry is omitted. In addition, a hydraulic motor 465 controlled by a push-button 466 is connected in series across the supply conductors 457 and 458, as is a defoamer motor 470 with a control push-button or on-off switch 471 connected in series therewith. The fill portion of the fill and seal apparatus is initiated by a control switch 475 and selectively operated solenoids 477 and 478 control respectively the opening and closing of the valves in the fill line. The opening valve has in addition a limit switch 480 which is defined as a no-carton no-fill switch and is positioned in the conveying line ahead of the filling station. It prevents energization of the solenoid 477 and filling of a carton when a no-carton is in the position on the conveying line to be filled. The control valves or solenoids 477 and 478 controlling the opening and closing of the supply line from the fluid source, such as the tank 300, to the containers or cartons to be filled are in turn controlled through a two position timing motor operator switch 482 which switch in the position 482b permits the energization of the closed solenoid 478 and in the position 482a permits the energization of the open solenoid 477. This circuit also includes an auto-transformer 490 with the tap 492 on the auto-transformer winding being connected through a conductor 494 which supplies power to the timer motor 495, containing switch 482. The timer motor indexes the operation of the switch 482 and also controls a contact 498 in the energization circuit of the control relay 500 which performs the timing function for operation of a hydraulic sealing solenoid 510 and a pair of solenoids 512 and 515 which control the energization of the conveying carriage and movement of bar 228 in the forward and return direction. As will be seen in FIGURE 16b, the conductor 494 includes a circuit through the timer motor contact 498 to the timing relay coil 500 which is connected to the supply conductor 458. In parallel with this contact is a normally open limit switch 516 which is activated to the closed position when the conveyer reaches the forward end of its travel. Also connected beyond the timing motor contact 498 and the limit switch contact 516 is a conductor 520 which leads to the relay coil 440 whose contact 440a is included in the carton forming control circuit. This circuit is completed through the conductor 521 leading to the conductor 458. Timing relay 500 has its contact 500a connected in series with a push-button switch 522 for automatic operation of the fill and seal portion of the apparatus from the conductor 494 and through the normally closed contact 428b of the control relay in the carton forming portion of the apparatus, which circuit is connected to the solenoid coil 515 controlling the energization of the carriage for the fill and seal portion of the apparatus in the forward direction. The circuit is completed through a normally closed limit switch 516b which is closed when the carriage is in a retracted position. Conductor 494 is also connected directly to solenoids 510 and 512 in parallel and through a second limit switch 516a which is activated to a closed position when the conveyer reaches the end of its travel in its forward direction. The solenoid 510 also controls the operation of the hydraulic circuit for the sealer after filling of the carton and solenoid 512 controls energization of the carriage in the return direction.

The synchronizing inter-connection between the filling and sealing carton portion of the improved machine allows either of the portions of the machine to run independently and normally if the other is not in operation. However, with both portions of the apparatus working, the faster system, which ever it may be, will delay and synchronize itself with the slower system. Either portions of the machine may be started first and the other at a later period of time without interruption to the operation of the overall machine. In this synchronization circuit, the relays 428 and 440 inter-connect the portions of the machine to perform the desired synchronization. Relay 428 is included in the energization circuit for the carton forming portion of the apparatus and is energized through the limit switch 374a which indicates raising of the heater 120 to an up position. The control contact 428b for this relay is placed in the energization circuit for the return conveying solenoid 515 of the sealing portion of the apparatus and will delay the conveyer operation as long as the relay 428 is energized, or until the sealing cycle of the carton forming portion of the apparatus is completed. In the event that the carton forming portion of the apparatus is not operating, and only the sealing portion of the apparatus, the normally closed contact 428a of the control relay 428 will not effect the operation of the sealing portion since the normally closed contact 428a will permit the sealing circuit to operate independently. The control relay 440 is energized in the sealing and filling portion of the machine at the same time that the timing relay 500 is energized through the energization and operation of the timing motor. The normally open contact 440a of this control relay and the normally open contact 428a of the control relay 428 provide a holding circuit for the energization and operation of the control relay 428 and the solenoids 425, 426, 427 controlling the sealing and pre-break operations on the carton. This will hold the pressure cycle on the carton forming portion of the machine active until the timer motor opens the contact 498. Thus the carton forming portion of the machine will be caused to delay and stay in synchronism with the filling and sealing portion of the machine in the event that the former is running faster. If the filling portion of the machine is not in operation, the relay 440 will not be energized and its normally open contact 440a will prevent the holding circuits on the pressure solenoids and control relay 428 from being effective. This will allow the carton forming portion of the machine to function normally.

Figure 15:
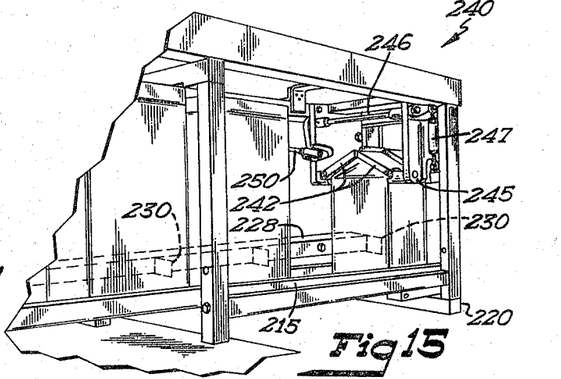
FIGURE 15 is a perspective view of the conveying apparatus and the top pre-break station of the improved carton forming and filling machine.

In the operation of the improved carton forming and filling machine, the apparatus is placed into operation by closure of the energizing initiating switches 311 for the carton forming portion and 455 for the filling and sealing portion. When it is desired to start the machine in operation, the start buttons 335, 342 are initiated as are the manually operated switches 522, 475, 471, 466 and 462 of the filling and sealing portions of the machine. A selection is made in the carton forming machine for the speed or sequence of operation through the operation of the switch 400 and the machine portions will then operate simultaneously and in synchronism. With the closure of switch 311, the energizing circuit for the vacuum motor and indexing motors 315 and 320 respectively are set up together with the energization of the control circuit through the transformer 312. Closure of the switch 335 completes the energization circuit for the vacuum motor 315 through operation of the relay 333. Similarly, closure of the switch 342 sets up the energization circuit for the heating controller 345 which must be placed in operation and arrive at a predetermined temperature before the control relay 350 is operated. This will apply full power through the heater 325 to the hood. Operation of the contact or start push-button 360 energizes the remaining portion of the control circuit together with the primary controlling relay 363. The relay contact 363a and the reset button 385 through the limit switches 374, 375 and 376 will energize timing relay 370 and control relay 330 controlling the index motor energization circuit. This will start the turntable to rotate and it will continue rotation until its limit switch 392 closes when the mandrels come to a rest position beneath the work station. At this time the primary timing relay 380 will be energized and one or the other of the cycling relays 395, 396 will be energized. The energization of timing relay 380 will complete the holding circuit for the relay 330 and timing relay 372. With the table in a rest position, the table limit switch 392a provides the current for the energization of the solenoid 412 which in turn causes the vacuum pick up to operate and also the vacuum line in the unloader to operate. When the vacuum pick up has completed its operation, its limit switch will operate the solenoids 418, 420 through the limit contact 415a. As limit contact 392a of the table energizes the control relay 412 this operation sets up a holding circuit for relay 412 to insure or complete the energization circuit through the limit switch 415a to the solenoids 418 and 420. The heater limit switch contact in the down position or contact 374a will energize the three solenoids 425, 426, 427 controlling respectively the application of pressure at the press, the application of the motive means for controlling the jaws at the base of the press to pre-crease the top folds of the carton and the motive device 427 which operates the final fold mechanism or pre-break 240 as shown in FIGURE 15. With the operation of the timing or cycling relays 395 or 396, one or the other of the contacts will control simultaneously therewith the energization of the solenoid 410 controlling the application of the heat hood to soften the bottom flaps of the carton at its particular station. As the primary timing relay times out, the holding circuit established through the control relay 382 and its contact 382a will insure the continuous operation of the index motor and the energization of the timing relay 370. This control relay functions only as a holding circuit. Upon completion of the timing of relay 380 one of the other of the cycling relays 395 or 396 will be de-energized to open the heat solenoid 410. This will allow the heater to return to its normal position breaking the circuit to the index motor relay 330 at the limit switch contact 374. Similarly as the loader solenoid reaches the bottom of its travel, its limit contact 424 de-energizes the control relay 412 to break the energization circuit to the unloader and loader solenoids 418, 420. Further, as the heater solenoid returns to its normal position, the limit contact 374a breaks the energizing circuit to the solenoids 425, 426, and 427 breaking the circuits to the press for the bottom of the carton, the pre-break mechanism for the carton top in the same station and the pre-break mechanism 240 on the conveyer line. With this sequence of operation completed, the apparatus is adapted to initiate the cycle over again at a rate determined by the selective operation of the cycling timers 395 or 396.

Simultaneously with the operation of the carton forming portion of the apparatus, the carton filling and sealing portion will be energized through the operation of its control switches 355, 466, 471, 475 and 522. The hydraulic motor 465 for the sealing portion of the apparatus and the defoaming motor 470 will be energized continuously. The primary timer 495 will control the energization and operation of the timing relay 500 and its control contacts 482a and 482b. Thus, as previously pointed out, the timing relay 500 or the solenoid 515 will be energized for the purpose of moving the carriage of the conveyer which is also the conveyer of the sealing and filling portion of the machine in a forward direction. As the timer motor times out, the energizing circuit for the timing relay will open with the opening of the limit switch 516 or the timing contacts 498 de-energizing the solenoid 515 and energizing the solenoids 510, 512. The hydraulic control of the sealer as operated by the solenoid 510 controls the final sealing at the end of the filling and sealing portion of the apparatus together with moving the associated filling and defoaming tubes in the proper position. Solenoid 512 controls the hydraulic motor operating the carriage to the return position. Thus when the cartons are at rest and the carriage 228 bar is being returned to the initial or starting position for the purpose of picking up new cartons, and assuming that a carton is in position underneath the filling valve as determined by the no-carton no-fill limit contact 480, will cause operation of the filling and defoaming apparatus together with sealing in the event the carton is in the sealing position. Simultaneous operation of the machine and synchronization of the portions of the same are effected by the control relays 428 and 440. Relay 428 is energized simultaneously with the pressure solenoids 425, 426, and 427 off of the heater limit switch 374a. Similarly, the relay 440 is energized with the operation of the timing motor 495 through its contact 498. Since their contacts are electrically interlocked between the two circuits, the sequence of synchronization as described above will be provided. Thus the normally closed contacts of the relay 428 which are in series with the solenoid 515 or the forward solenoid of the conveyer will delay conveyer operation as long as the relay 428 is energized. This will insure that the sealing cycle and the pressure solenoid will be completed. The relay 440 is energized in the filling and sealing portion of the circuit at the same time as the timing relay is functioning which in turn maintains the holding circuit through its normally open contact 500a. This holding circuit for the pressure solenoid 425 will hold it active until the timing coil or relay 500 is deactivated. Thus the carton forming portion of the circuit will be delayed and stay in synchronism with the carton filling and sealing portion of the circuit in the event that the former attempts to run faster. Either the carton forming or carton sealing portions of the circuit may be deactivated and the remaining portions of the circuit operated to form cartons or to take formed cartons and fill and seal the same. Thus if the filling and sealing portions of the circuit is deactivated, the holding contact 440a in the energizing circuit of the pressure solenoid 450 is not in operation and hence the carton forming portion of the machine may run independently and normally. Similarly, if the carton forming portion of the machine is not operating, the contacts 428b of the control relay 428 is de-energized and in the normally closed position such that the carton filling and sealing portion of the circuit may be operated independently and without interruption.

In the improved carton forming and filling machine, the cartons are taken from the blank holder in flattened form and erected on a mandrel with the bottom flaps heated and sealed. Simultaneously with the sealing of the bottom flaps, the top flaps in the gable top type carton are broken or prepared for filling such as is shown by the structure in FIGURE 12. This simplifies a complex top preparation through the use of a simplified mandrel which provides for openings therein such that pre-break jaws may operate on the carton at the same time the bottom is being sealed. Further, this arrangement of parts facilitates the use of a simplified pre-break of the remaining portion of the top carton or the side flaps thereof preparatory to ultimate filling and sealing. Thus the two portions of the machine may be combined in a simple integral unit capable of operation by a single individual and being of such physical size to occupy minimum space. Either of the machines may be operated independent of one another and they are structurally inter-connected and energized to operate simultaneously and in synchronism.

Therefore, in considering this invention it should be remembered that this disclosure is basically illustrative and that variations may be made to the component parts of the machine identified as conventional within the scope

What is claimed is:

1. A machine for erecting a flat tubular carton blank of the gable top type, comprising,
   (a) a frame structure;
   (b) a turntable pivotally mounted on said frame structure and including motive means adapted to rotate said turntable relative to said frame structure about an axis of rotation in an arcuate stepped movement;
   (c) a plurality of spaced mandrels mounted on said turntable with their length substantially parallel to the axis of rotation of the turntable;
   (d) a plurality of work space stations positioned on said frame structure around and adjacent the turntable with the mandrels thereon;
   (e) a carton blank, dispensing and loading means positioned at the first of said stations and operative to erect the flap carton blank and advance the erected carton blank onto a mandrel on the turntable;
   (f) a carton blank break means included in said first station and operative to pre-bend bottom flaps of said carton blank at said first station;
   (g) heating means positioned at a second of said stations and operative to heat the pre-bent bottom flaps of the carton blank;
   (h) pressure sealing means positioned at the third of said stations and operative to seal the pre-bent and heated bottom flaps of the carton to seal the bottom of the carton positioned inverted on the mandrel;
   (i) top flap pre-break means included in said third station and operative to fold top flaps of said carton blank positioned at the bottom of the mandrel;
   (j) carton removal and inverting means positioned at the fourth of said stations and operative to remove the pre-formed and pre-bent carton blank from the mandrel;
   (k) and control circuit means including timing means for operating each of the forming means at the respective stations substantially simultaneously after which the motive means steps the turntable.

2. A machine for forming and filling a tubular carton comprising:
   (a) a frame structure;
   (b) a turntable pivotally mounted on said structure and including motive means adapted to rotate said turntable relative to said frame structure about an axis of rotation in an arcuate stepped movement;
   (c) a plurality of spaced mandrels mounted on said turntable with their length substantially parallel to the axis of rotation of the turntable;
   (d) a plurality of work space stations positioned on said frame structure around and adjacent turntables with the mandrels thereon;
   (e) a carton blank, dispensing and loading means positioned at the first of said stations and operative to erect the flap carton blank and advance the erected carton blank onto a mandrel on the turntable;
   (f) carton blank break means included in said first station and operative to pre-bend bottom flaps of said carton blank at said first station;
   (g) heating means positioned at a second of said stations and operative to heat the pre-bent bottom flaps of the carton blank;
   (h) pressure sealing means positioned at the third of said stations and operative to seal the pre-bent and heated bottom flaps of the carton to seal the bottom of the carton positioned inverted on the mandrels;
   (i) top flap pre-break means included in said third station and operative to fold top flaps of said carton blank positioned at the bottom of the mandrel;
   (j) carton removal and inverting means positioned at the fourth of said stations and operative to remove the pre-formed and pre-bent carton blank from the mandrel;
   (k) control circuit means including timing means for operating each of the forming means at the respective stations substantially simultaneously after which the motive means steps the turntable;
   (l) additional support means including conveying means connected to said frame structure and adapted to receive the turned over cartons from said carton removal and inverting means;
   (m) filling means mounted on said additional support means and above said conveying means;
   (n) heating and sealing means disposed adjacent said filling means and said conveying means and mounted on said additional support structure;
   (o) motive means for driving said conveying means;
   (p) and control means including timing means operating said motive means, said filling means and said sealing means to fill and seal said cartons in a timed sequence and in sequence within the stepped operation of said turntable.

3. The machine of claim 2, and including additional top break means mounted on said conveying means and operative to break additional top folds in said gabled top of said carton, said top break means being operated in synchronism with the filling and sealing means.

4. The machine of claim 2, and including electrical circuit means interconnecting the timing means for the filling and sealing means and the timing means in the control circuit means for the plurality of means at said plurality of stations to synchronize the operation of the forming and filling machine.

5. The machine of claim 1 in which the spaced mandrels have tapered recesses therein at the extremity adjacent the turntable which cooperate with the top break means of the third station to crease the triangular infold panels of the gabled top of the carton as the pressure sealing means seals the bottom fold flaps of the carton.

6. The machine of claim 5 in which the portion of the recessed mandrel is tapered on all sides thereof, and the top break means includes a pair of arms disposed to either side of said mandrel, when positioned at the third station which arms are operative to engage the infold triangular panels of the inverted carton to pre-break the same.

7. The machine for forming a flat tubular carton blank into a gable top type carton comprising:
   (a) a frame structure;
   (b) a turntable pivotally mounted on said frame structure and including motive means adapted to rotate the turntable relative to the frame structure about an axis of rotation in an arcuate stepped movement;
   (c) a plurality of spaced mandrels mounted on said turntable;
   (d) means included on said frame structure for erecting a flat tubular carton blank and positioning said carton blank on said plurality of spaced mandrels, pre-bending bottom flaps of said tubular carton blank, heating and sealing said flaps to form the bottom of the carton;
   (e) additional means included on said frame structure, and operative simultaneously with said first name means for pre-breaking the top flaps of said erected carton on the mandrel simultaneous with the operation of said first name means;
   (f) and means for removing said inverted carton from said mandrel.

8. The machine for forming a flat tubular carton blank into a gable top type carton comprising:
   (a) a frame structure;
   (b) a turntable pivotally mounted on said frame structure and including motive means adapted to rotate the turntable relative to the frame structure about an axis of rotation in an arcuate stepped movement;
   (c) a plurality of spaced mandrels mounted on said turntable;

(d) means included on said frame structure for erecting a flat tubular carton blank and positioning said carton blank on said plurality of spaced mandrels, pre-bending bottom flaps of said tubular carton blank, heating and sealing said flaps to form the bottom of the carton;

(e) additional means included on said frame structure and operative simultaneously with said first name means for pre-breaking the top flaps of said erected carton on the mandrel simultaneous with the operation of said first name means;

(f) means for removing said inverted carton from said mandrel;

(g) and means for receiving said inverted carton blank, folding the remaining top fold of said gable top, filling and sealing said carton.

9. The machine of claim 7 in which said mandrels include recessed surfaces and said additional means includes pivoted arms engaging the infold flaps of the top of the gable top type carton positioned inverted of the mandrel for infolding the triangular infold flaps.

10. The machine for forming a flat tubular carton blank into a gable top type carton comprising:

(a) a frame structure;

(b) a turntable pivotally mounted on said frame structure and including motive means adapted to rotate the turntable relative to the frame structure about an axis of rotation in an arcuate stepped movement;

(c) a plurality of spaced mandrels mounted on said turntable;

(d) means included on said frame structure for erecting a flat tubular carton blank and positioning said carton blank on said plurality of spaced mandrels, pre-bending bottom flaps of said tubular carton blank, heating and sealing said flaps to form the bottom of the carton;

(e) additional means included on said frame structure and operative simultaneously with said first name means for pre-breaking the top flaps of said erected carton on the mandrel simultaneous with the operation of said first name means;

(f) means for removing said inverted carton from said mandrel;

(g) means for receiving said inverted carton blank, folding the remaining top folds of said gable top, filling and sealing said carton;

(h) and means for synchronizing the operation of said first and second name means with said filling and sealing means.

11. The machine for erecting a flat tubular carton of the gable top type in claim 1 in which the heating means at the second of said stations included means for circulating heated air to inner and outer surfaces of the pre-bent bottom flaps of the carton blank.

12. The machine for erecting a flat tubular carton of the gable top type in claim 11 in which the heating means includes a hood with heating elements positioned around the inner peripheral surface of the hood, and an air nozzle positioned at the center of the hood and adapted to be connected to a source of air under pressure and with the hood movable toward and away from the gable top carton blanks on the mandrels to heat uniformly the flaps of the carton blank on both surfaces thereof through circulation of the heated air.

References Cited by the Examiner

UNITED STATES PATENTS 2,957,289   10/1960   Monroe et al.    53—186
3,196,760   7/1965   Terry    93—44.1

FRANK E. BAILEY, *Primary Examiner.*

R. L. FARRIS, *Assistant Examiner.*